(12) United States Patent
Engelin et al.

(10) Patent No.: US 6,843,210 B2
(45) Date of Patent: Jan. 18, 2005

(54) THERMOSTATIC VALVE AND METHOD FOR CONTROLLING A COOLANT CIRCUIT

(75) Inventors: Werner Engelin, Esslingen (DE); Hartmut Engels, Wolfschlugen (DE); Erhard Rau, Weilheim (DE); Jochen Weeber, Filderstadt (DE); Frank Weinert, Wimsheim (DE)

(73) Assignee: DaimlerChrysler AG, Stuttgart (DE)

( * ) Notice: Subject to any disclaimer, the term of this patent is extended or adjusted under 35 U.S.C. 154(b) by 80 days.

(21) Appl. No.: 10/365,606

(22) Filed: Feb. 13, 2003

(65) Prior Publication Data

US 2003/0177985 A1 Sep. 25, 2003

(30) Foreign Application Priority Data

Feb. 14, 2002 (DE) .......................... 102 06 359

(51) Int. Cl.[7] ................................ F01P 7/14
(52) U.S. Cl. ....................... 123/41.1; 236/34
(58) Field of Search ............... 123/41.1, 41.05, 123/41.01, 41.02, 41.08; 236/34.5, 34, 91 R (56) References Cited

U.S. PATENT DOCUMENTS

| | | | |
|---|---|---|---|
| 3,817,450 A | 6/1974 | Mischke | ..................... 236/345 |
| 3,877,443 A | 4/1975 | Henning et al. | |
| 4,196,847 A | 4/1980 | Gobien | |
| 4,456,167 A | 6/1984 | Bueter | ........................ 236/345 |
| 5,174,254 A | * 12/1992 | Humburg | ............. 123/142.5 R |
| 6,164,248 A | * 12/2000 | Lehmann | .................... 123/41.1 |
| 6,539,899 B1 | * 4/2003 | Piccirilli et al. | ........... 123/41.1 |

FOREIGN PATENT DOCUMENTS

EP 0467130 A1 1/1992

* cited by examiner

Primary Examiner—Mahmoud Gimie
Assistant Examiner—Katrina B. Harris
(74) Attorney, Agent, or Firm—Crowell & Moring LLP (57) ABSTRACT

A thermostatic valve for a coolant circuit of an internal combustion engine, with a housing through which the flow is capable of passing and which has a first throughflow orifice for connection to a first coolant line, a second throughflow orifice for connection to a second coolant line, and a third throughflow orifice for connection to a third coolant line, and with a closure member which is mounted in the housing and which can be adjusted by an actuating unit, the closure member having a first shut-off element for shutting off the first throughflow orifice and a second shut-off element, coupled to the first shut-off element, for shutting off the second throughflow orifice. The second shut-off element is assigned an adjusting device, via which the second shut-off element can be adjusted relative to the first shut-off element in such a way that the closure member can be brought, on one hand, into a passage position in which it can close exactly one throughflow orifice, and, on another hand, into a shut-off position, in which it can close two throughflow orifices.

26 Claims, 6 Drawing Sheets

THERMOSTATIC VALVE AND METHOD FOR CONTROLLING A COOLANT CIRCUIT

BACKGROUND AND SUMMARY OF THE INVENTION

This application claims the priority of German Patent Document 102 06 359.1-22, filed on Feb. 14, 2002, the disclosure of which is expressly incorporated by reference herein.

The invention relates to a thermostatic valve for a coolant circuit of an internal combustion engine comprising a housing through which a flow is capable of passing and which has a first throughflow orifice for connection to a first coolant line, a second throughflow orifice for connection to a second coolant line, and a third throughflow orifice for connection to a third coolant line, a closure member which mounted in the housing and which can be adjusted by an actuating unit, the closure member having a first shut-off element for shutting off the first throughflow orifice and a second shut-off element, coupled to the first shut-off element, for shutting off the second throughflow orifice; and to a method for operating an internal combustion engine of a motor vehicle having a coolant circuit.

An aspect of the invention is to make available a particularly efficient thermostatic valve, capable of being produced in a simple way, for the cooling circuit of an internal combustion engine, a coolant circuit of an internal combustion engine, the said coolant circuit being capable of being activated particularly simply, and a method for appropriately controlling the thermostatic valve, the coolant circuit and the internal combustion engine.

This aspect may be achieved by way of a thermostatic valve—in that the second shut-off element is assigned an adjusting device via which the second shut-off element can be adjusted relative to the first shut-off element in such a way that the closure member can be brought, on one hand, into a passage position, in which the closure member can close exactly one of the throughflow orifices, and, on the other hand, into a shut-off position in which the closure member can close two of the throughflow orifice—a coolant circuit—comprising a coolant/air heat exchanger which is assigned a bypass line, coolant branching between a heat exchanger line and the bypass line being controllable as a function of temperature via a thermostatic valve which has a first connection to the heat exchanger line, a second connection to the bypass line, and a third connection to a supply or discharge line located on an internal combustion engine side and which comprises a closure member which can be adjusted by way of an actuating unit and which is assigned a first shut-off element for shutting off the heat exchanger line and a second shut-off element coupled to the first shut-off element for shutting off the bypass line, wherein the second shut-off element is assigned an adjusting device via which the second shut-off element can be adjusted relative to the first shut-off element in such a way that the closure member can be brought, on one hand, into a passage position, in which the closure member can close either the bypass line or the heat exchanger line, and, on the other hand, into a shut-off position in which the closure member can close both the bypass line and the heat exchanger line—and a method—in which, after a cold start of the internal combustion engine, the coolant circuit is initially interrupted by a thermostatic valve, and subsequently, the coolant circuit is opened between the internal combustion engine and a bypass line by an adjustment of a closure member of the thermostatic valve.

Further features and feature combinations may be gathered below and from the subclaims, the description and the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
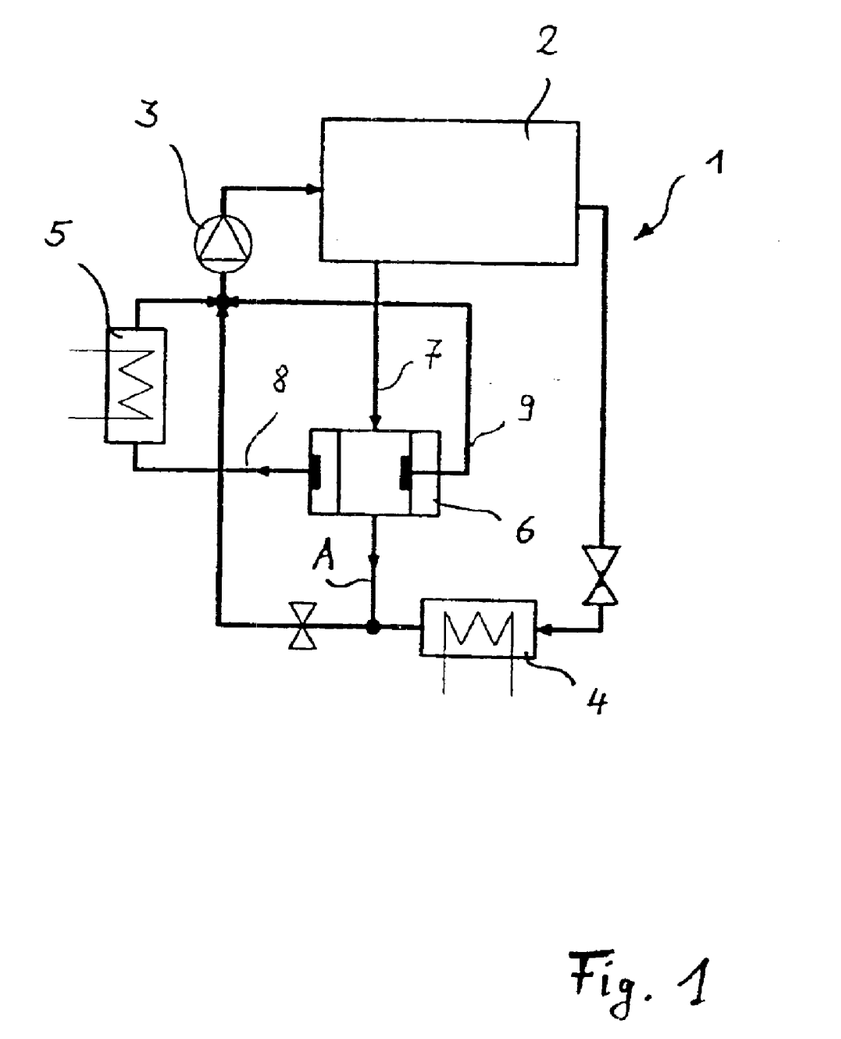
FIG. 1 shows a diagrammatic illustration of a coolant circuit of an internal combustion engine.

FIG. 1 illustrates diagrammatically a coolant circuit 1 of an internal combustion engine 2, in which coolant circuit a coolant, in particular water, is circulated by a coolant pump 3. Coming from the internal combustion engine 1, the coolant can be supplied, on the one hand, to a heating heat exchanger 4 and, on the other hand, to an ambient-air heat exchanger 5, which is known as the radiator. A corresponding line arrangement allows the flow to pass through the heating heat exchanger 4 and the radiator 5 independently of one another, a thermostatic valve 6 being provided for controlling the coolant flow (or the coolant volume stream). Depending on the control of the coolant flow, a different heat transfer can take place via the different heat exchangers. The thermostatic valve 6 is assigned a plurality of supply and discharge lines which are described below.

Coolant can be supplied directly from the internal combustion engine 2 to the thermostatic valve 6 via an engine-side supply line 7. At the valve 6, there is a branching of the coolant stream or an alternating transfer, on the one hand, into a short-circuit discharge line 9 (bypass) or, on the other hand, into a radiator-side discharge line 8. A tap line A which can be provided, as required and is capable, where appropriate, of being shut off allows an auxiliary throughflow of the thermostatic valve 6, during which coolant is led out of the supply line 7 into the heating heat exchanger line branch, with the result that a thermal control of the thermostatic valve 6 by way of hot coolant can be implemented.

Figure 2A:
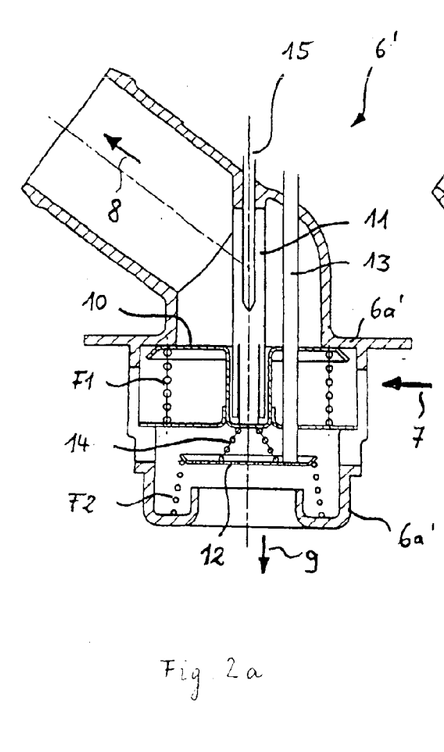
FIG. 2 shows a diagrammatic illustration of a first thermostatic valve in three different working positions.
Figure 2B:
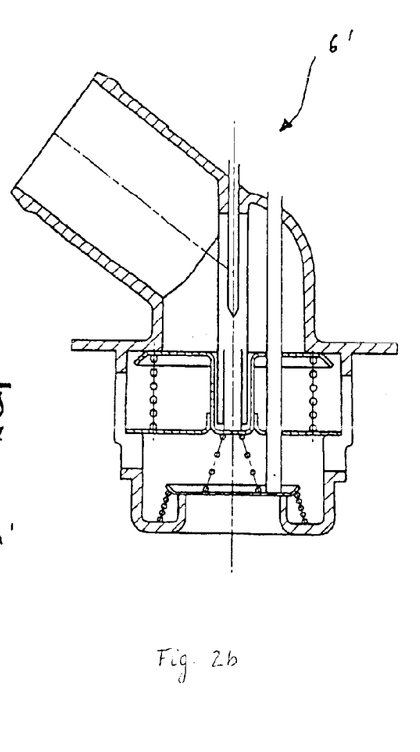
Figure 2C:
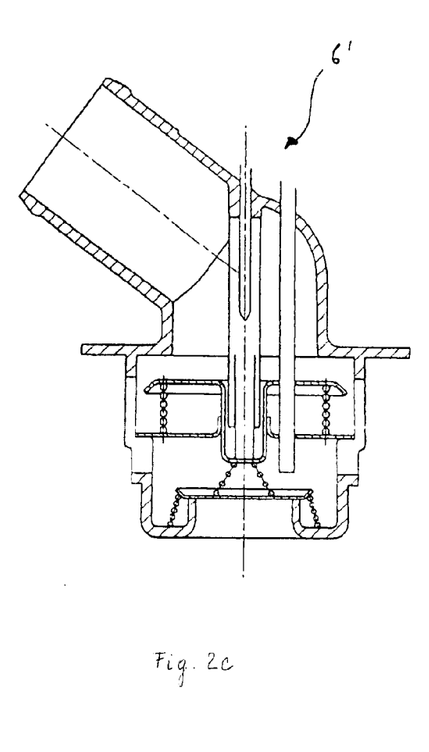

FIGS. 2a–c illustrate a two-disc thermostatic valve 6' in three different working positions (illustrations a, b, c). The valve 6' is assigned an engine-side supply line 7, a radiator-side discharge line 8 and a short-circuit discharge line 9. Corresponding throughflow orifices are provided in the valve housing 6a'. If required, a tap line A, as outlined above, may also be provided.

To control the coolant volume stream through the valve 6', shut-off elements in the form of two valve discs 10, 12 movable particularly in translational motion are arranged within the valve housing 6a'. The valve discs together form a closure member for shutting off the throughflow orifices of the valve. The first valve disc 10 is provided for shutting off the radiator-side discharge line 8 and is displaceable via a first adjusting element in the form of an expansion element 11, whilst the second valve disc 12 is provided for shutting off the short-circuit discharge line 9 and is suspended on the first valve disc by way of a spring element 14. The first valve disc 10 is pressed, by a spring F1 supported against the housing 6a', into its position of rest, in which the radiator-side discharge line 8 is shut off. The second valve disc 12 is loaded by a spring F2 in the direction of an opening position (as illustrated in FIG. 2a).

The first valve disc 10 is pierced by a second adjusting element 13 which is movable parallel to the first adjusting element 11 and which is provided for the separate activation of the second valve disc 12. A liquid-tight seal (as shown in FIG. 2b) is provided between the first valve disc 10 and the second adjusting element 13. In a modified exemplary embodiment, the second adjusting element is guided past the first valve disc with a clearance, as shown in FIGS. 2a–c. In a further modified exemplary embodiment, an expansion element (if appropriate, externally activatable) is arranged as an actuating device for the second valve disc between the first and the second valve disc.

The first adjusting element 11 is assigned an energy supply device 15 which allows external heating. The energy supply device 15 may be designed as a hydraulic or pneumatic line arrangement, by way of which a thermally controlled medium can be supplied in a controlled manner to the expansion element. Alternatively, the energy supply device 15 is designed, for example, as electrical resistance heating.

The second adjusting element 13 can be activated independently of the first adjusting element 11, in particular electrically, electromechanically, hydraulically or pneumatically.

The general temperature regulation of the two-disc thermostatic valve 6' takes place via the expansion or first adjusting element 11, the passages to the radiator-side discharge line 8 and to the short-circuit discharge line 9 being opened or closed codirectionally, that is to say in parallel, according to the introduction of heat into the expansion element 11 caused by coolant flowing through the valve. This functionality can be set at a (pre)determined coolant temperature. In principle, either an open radiator-side discharge line 8 or an open short-circuit discharge line 9 is obtained.

According to certain preferred embodiments of the invention, this relation is "broken" in that the second valve disc 12 can be activated separately by way of the second adjusting element 13, so that the valve discs 10, 12 are uncoupled in terms of their position.

FIG. 2a shows a first working position with an open short-circuit discharge line 9 and a closed radiator-side discharge line 8, so that the coolant circulates in what may be referred to as the engine short-circuit. As shown in FIG. 2c, a second working position is obtained, in which the short-circuit discharge line 9 is closed and the radiator-side discharge line 8 is open. The valve discs 10, 12 can be moved back and forth jointly between the first and the second working position by way of the first adjusting element 11. Starting from the first working position as in FIG. 2a, the second valve disc 12 can be activated with the aid of a second adjusting element 13 in such a way that the second valve disc shuts off the short-circuit discharge line 9, so that both the radiator-side discharge line 8 and the short-circuit discharge line 9 are completely closed as in FIG. 2b.

Figure 3A:
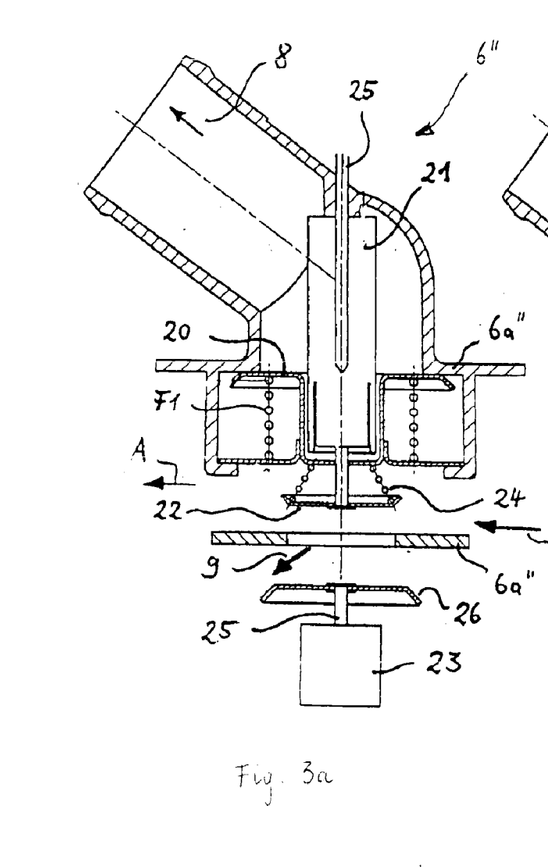
FIG. 3 shows a diagrammatic illustration of a second thermostatic valve in three different working positions.
Figure 3B:
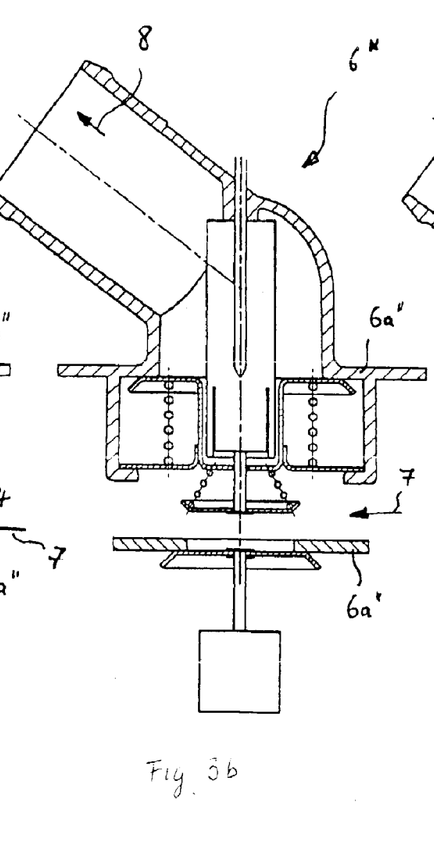
Figure 3C:
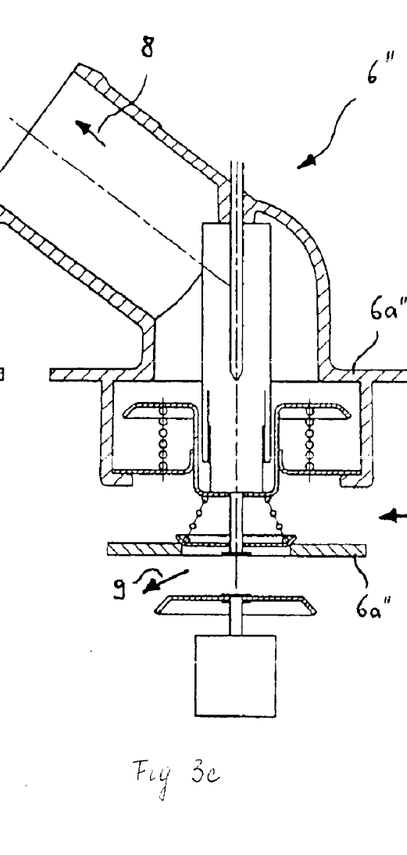

FIGS. 3a–c illustrate a two-disc thermostatic valve 6" in three different working positions. The valve 6" is assigned an engine-side supply line 7, a radiator-side discharge line 8 and a short-circuit discharge line 9. Corresponding through-flow orifices are provided in the valve housing 6a". If required, a tap line A may be provided, via which an auxiliary flow can be extracted from the valve 6a".

To control the coolant volume stream through the valve 6" or to shut off the throughflow orifices of the valve housing, two valve discs 20, 22 movable particularly in translational motion are arranged within the valve housing 6a", the valve discs forming part of the closure member of the valve. The first valve disc 20 is provided for shutting off the radiator-side discharge line 8 and is displaceable via a first adjusting element in the form of an expansion element 21, whilst the second valve disc 22 is provided for shutting off the short-circuit discharge line 9 and is suspended on the first valve disc by way of a spring element 24. The first valve disc 20 is pressed, by a spring F1 supported against the housing 6a", into its position of rest, in which the radiator-side discharge line 8 is shut off.

A third valve disc 26 and a second adjusting element 23 are arranged outside the valve housing 6a" and are coupled via a rod 25 and mounted on the housing side. The second adjusting element 23 can be actuated or activated independently of the expansion or first adjusting element 21 electrically, electromechanically, pneumatically and/or hydraulically and itself, in turn, adjusts the third valve disc 26. This actuation takes place independently of an adjustment of the valve discs 20, 22. In a modified embodiment, the third valve disc (if appropriate, together with the actuating element) is likewise arranged within the valve housing. In any event, the third valve disc likewise forms part of the closure member of the valve 6a".

The first expansion or adjusting element 21 is assigned an energy supply device 25 which allows external heating. The energy supply device 25 may be designed as a hydraulic or pneumatic line arrangement, by means of which a thermally controlled medium can be supplied in a controlled manner to the expansion element. Alternatively, the energy supply device 25 is designed, for example, as electrical resistance heating.

The general temperature regulation of the two-disc thermostatic valve 6" takes place via the expansion element 21, the passages to the radiator-side discharge line 8 and to the short-circuit discharge line 9 being opened or closed codirectionally, that is to say in parallel, according to the introduction of heat into the expansion element 21 caused by coolant flowing through the valve. This functionality can be set at a (pre)determined coolant temperature. In principle, either an open radiator-side discharge line 8 or an open short-circuit discharge line 9 is obtained.

This relation is broken in that the third valve disc 26 is to be brought by way of the second adjusting element 23, separately and independently of the two valve discs 20, 22, into a closing position in which the short-circuit discharge line 9 is shut off. An arrangement of this type constitutes a separate shut-off of the short-circuit bypass.

FIG. 3a shows a first working position with an open short-circuit discharge line 9 and a closed radiator-side discharge line 8, so that the coolant circulates in what may be referred to as the engine short-circuit. As shown in FIG. 3c, a second working position is obtained, in which the short-circuit discharge line 9 is closed and the radiator-side discharge line 8 is open. The valve discs 20, 22 can be moved back and forth jointly between the first and the second working position by way of the expansion or first adjusting element 21. Starting from the first working position, as in FIG. 3a, the third valve disc 26 can be activated with the aid of the second adjusting element 23 in such a way that the third valve disc shuts off the short-circuit discharge line 9, so that both the radiator-side discharge line 8 and the short-circuit discharge line 9 are completely closed. Likewise, starting from the second working position as in FIG. 3c, the short-circuit discharge line 9 can be virtually additionally shut off by way of the valve disc 26, so that the valve discs 20, 22 can subsequently be moved into the first working position, as in FIG. 3a, without the short-circuit discharge line 9 being opened.

Figures 4A, 4B, 4C:
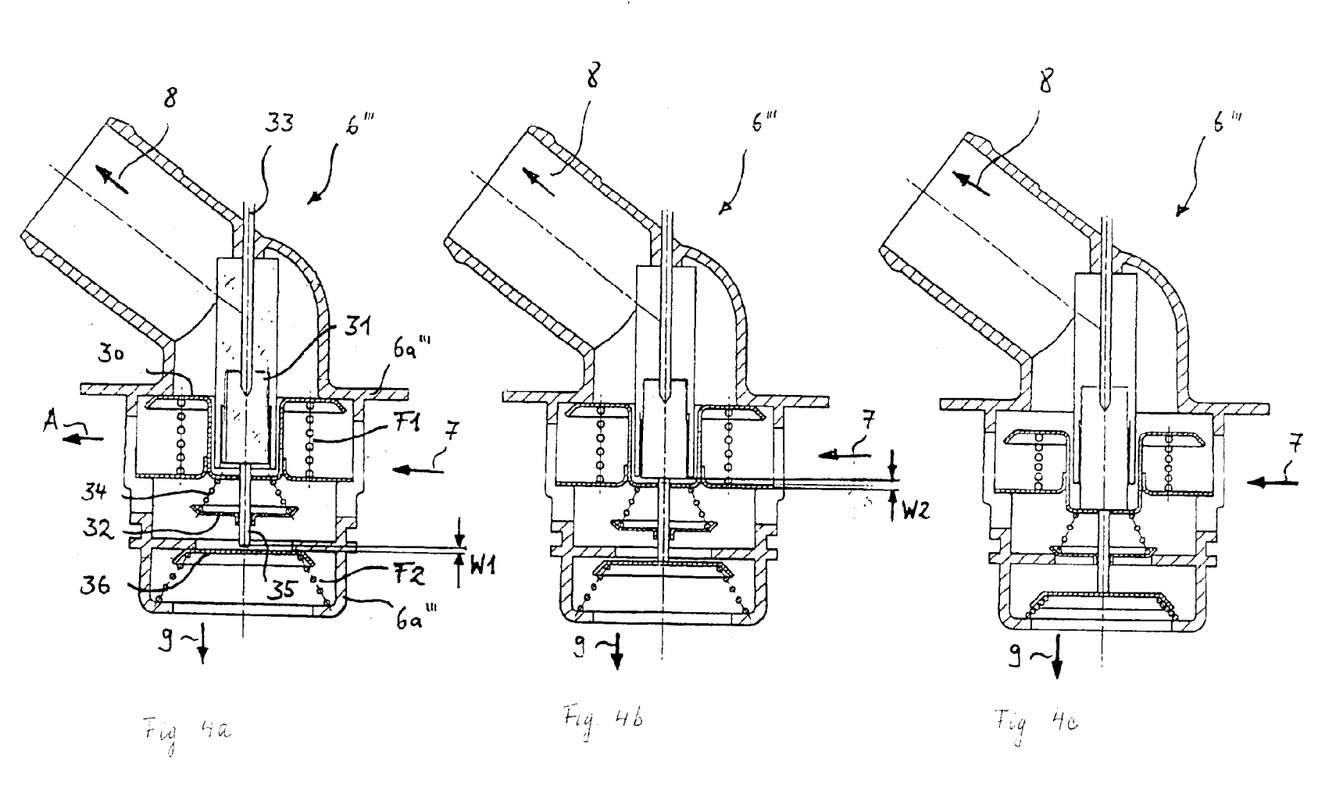
FIG. 4 shows a diagrammatic illustration of a third thermostatic valve in three different working positions.

FIGS. 4a–c illustrate a three-disc thermostatic valve 6′′′ in three different working positions. The valve 6′′′ is assigned an engine-side supply line 7, a radiator-side discharge line 8 and a short-circuit discharge line 9. If required, a tap line A may be provided, via which an auxiliary flow can be extracted from the valve 6a′′′.

For controlling the coolant volume stream through the valve 6′′′, three valve discs 30, 32, 36 movable particularly in translational motion are arranged within the valve housing 6a′′′. The first valve disc 30 is provided for shutting off the radiator-side discharge line 8 and is displaceable via a first adjusting element in the form of an expansion element 31, whilst the second valve disc 32 is provided for shutting off the short-circuit discharge line 9 and is suspended on the first valve disc 30 by way of a spring element 34. The first valve disc 30 is pressed, by a spring F1 supported against the housing 6a′′′, into its position of rest, in which the radiator-side discharge line 8 is shut off.

In a lower portion of the valve housing 6a′′′, the third valve disc 36 is arranged, and it is pressed, by way of a spring F2 supported against the housing 6a′′′, into its position of rest, in which the short-circuit discharge line 9 is shut off. The third valve disc 36 can be activated by way of the expansion element 31 via a rod 35 which pierces the valve discs 30, 32. The third valve disc 36 can also be activated, furthermore, via prevailing pressure differences.

The expansion element 31 is assigned an energy supply device 33 which allows external heating. The energy supply device 33 may be designed as a hydraulic or pneumatic line arrangement, by way of which a thermally-controlled medium can be supplied in a controlled manner to the expansion element 31. Alternatively, the energy supply device 33 is designed, for example, as electrical resistance heating.

The temperature regulation of the three-disc thermostatic valve 6′′′ takes place via the expansion element 31, the valve discs 30, 32 being adjusted codirectionally, that is to say in parallel, according to the introduction of heat into the expansion element 31 caused by coolant flowing through the valve, whilst the third valve disc 36 is activated via the rod 35, uncoupling being provided as follows.

In a first working position of the valve 6′′′, as in FIG. 4a, the rod 35 is arranged with a clearance W1 relative to the third valve disc 36. This clearance W1 constitutes an idling travel of the rod 35. At the same time, the rod 35 is designed to be larger by a particular length W2 than is the dimension of the clearance between the valve discs 30 and 36 in the respective position of rest (see FIG. 4a). This length W2 constitutes the uncoupled working travel of the third valve disc 36 which the valve disc 36 can execute independently of the other two valve discs. The lengths W1 and W2 can be predetermined by virtue of construction and determine the functional characteristic of the valve 6′′′. In this case, the idling travel W1 is maximum in the cold state of the expansion element 31. It approaches zero when the coolant reaches a temperature at which the short-circuit discharge line 9 (bypass) is to be opened.

FIG. 4a shows the first working position with a shut-off short-circuit discharge line 9 and a shut-off radiator-side discharge line 8, so that the coolant in the cooling circuit 1 either is completely stationary or, if provided, flows through a tap line A. The rod 35 has clearance relative to the third valve disc 36 by the amount of the travel W1. As in FIG. 4b, a second working position is obtained, in which the rod 35 is in contact with the third valve disc 36. The short-circuit discharge line 9 can thus be opened as a result of an expansion of the expansion element 31, and the radiator-side discharge line 8 can also remain shut off in the event of an expansion of the expansion element 31.

Starting from the second working position, as in FIG. 4b, the third valve disc 36 can be activated with the aid of the (preferably externally activatable) expansion element 31 in such a way that it opens the short-circuit discharge line 9, so that the latter is successively opened, counter to the force of the spring F2, with an expansion of the expansion element 31 and is successively closed, by way of the spring F2, with a contraction of the expansion element. In a modified exemplary embodiment, the valve disc 36 is mounted, for example, not only linearly displaceably, but also pivotably, via a non-uniform spring load.

After the expansion element 31 has expanded by the length W2, in the event of further expansion it not only takes up the third valve disc 36, but also the first valve disc 30 (and, with the latter, the second valve disc 32). A working position (not illustrated) is obtained, in which both the radiator-side discharge line 8 and the short-circuit discharge line 9 are at least partially opened. A coolant flow through the short-circuit discharge line 9 and subsequently also through the radiator-side discharge line 8 is established. Finally, a further expansion of the expansion element 31, which is brought about preferably by the heated coolant, brings the valve 6′′′ into a third working position, as in FIG. 4c, in which the short-circuit discharge line 9 is closed by way of the second valve disc 32 and the radiator-side discharge line 8 is released by the first valve disc 30 counter to the force of the spring F1.

In a preferred modified exemplary embodiment, instead of one expansion element 31, two separate expansion elements preferably connected in series and having different response characteristics are provided. In particular, the two separate expansion elements contain fillings with waxes which have different expansion properties or fusion and/or transformation temperatures. Preferably, in this case, the first expansion element can be activated via an external heating device, independently of a coolant flow in the valve, and is arranged in such a way that the expansion element can displace the third valve disc out of its position of rest, whilst the second expansion element can be activated via the coolant flow in the valve.

In a further modified exemplary embodiment, the expansion element provided is a bimetallic element or an expansion element consisting of a metallic memory alloy, the expansion element being assigned in each case a first expansion characteristic in a lower temperature range and another expansion characteristic in a higher temperature range.

FIGS. 5a–d illustrate a three-disc thermostatic valve 6′′′′ in four different working positions (illustrations a, b, c, d). The valve 6′′′′ is assigned an engine-side supply line 7, a radiator-side discharge line 8 and a short-circuit discharge line 9.

For controlling the coolant volume stream through the valve 6′′′′, three valve discs 40, 42, 46 movable particularly in translational motion are arranged within the valve housing 6a"". The first valve disc 40 is provided for shutting off the radiator-side discharge line 8, whilst the second valve disc 42 is provided for shutting off the short-circuit discharge line 9 and is suspended on the first valve disc 40 by way of a spring element 44. The first valve disc 40 is pressed, by a spring F1 supported against the housing 6a"", into its position of rest, in which the radiator-side discharge line 8 is shut off.

The third valve disc 46 is arranged in a lower portion of the valve housing 6a"" and is pressed, by way of a spring F2 supported against the housing 6a"", into its position of rest, in which the short-circuit discharge line 9 is shut off. The third valve disc 46 can be activated via a rod 45 which pierces the valve discs 40, 42.

Figures 5A, 5B, 5C, 5D:
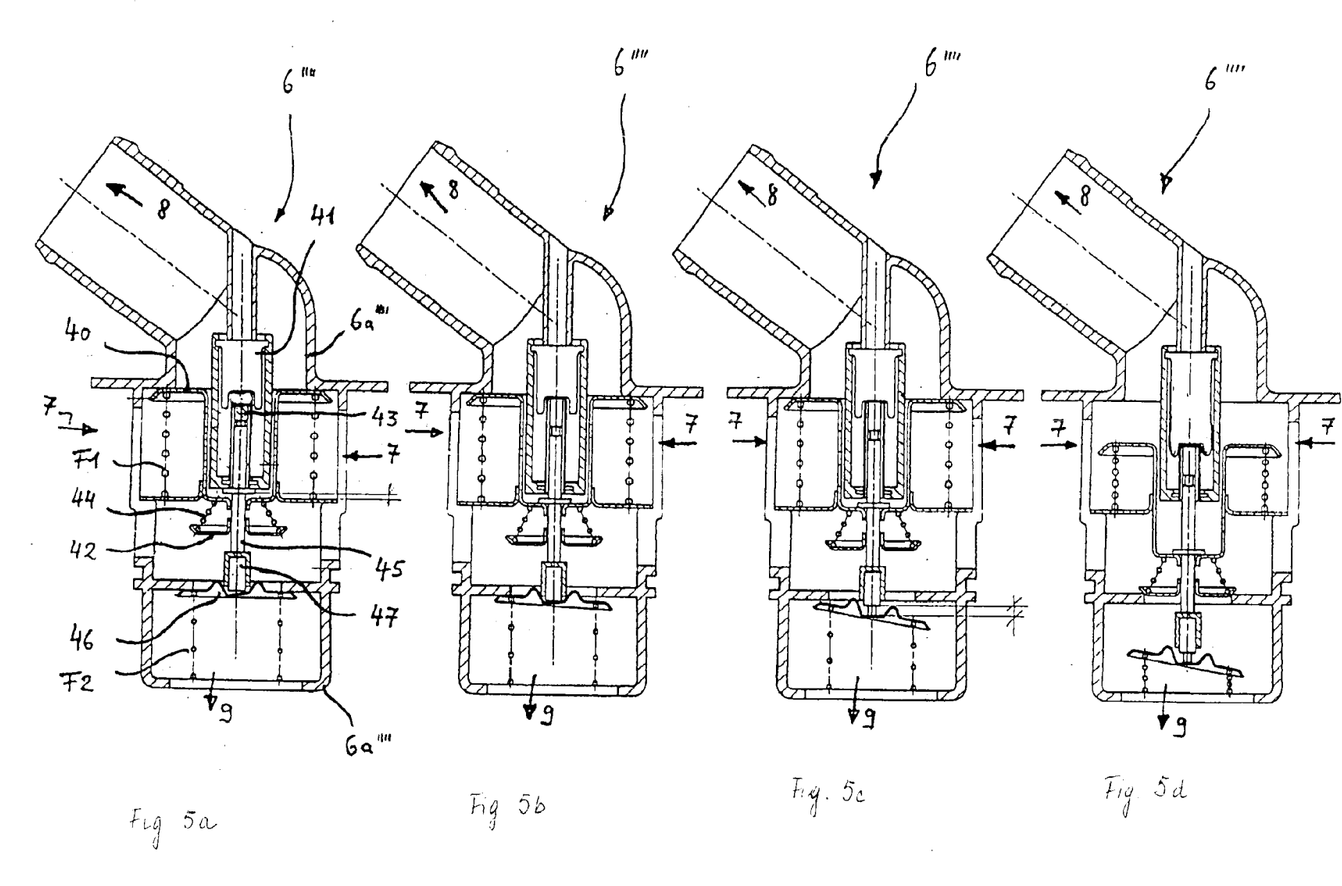
FIG. 5 shows a diagrammatic illustration of a fourth thermostatic valve in four different working positions.

The temperature regulation of the three-disc thermostatic valve 6"" takes place, in principle, in the same way as the control of the valve 6"". However, three expansion elements 41, 43, 47 are provided. The first expansion element 41, preferably activatable via an external supply of heat, serves for the codirectional adjustment of the valve discs 40 and 42 (adjustment between the two working positions as in FIGS. 5c–d), whilst the two expansion elements 43, 47 arranged on the rod 45 serve for the uncoupled adjustment of the valve disc 46. The second expansion element 43 can be activated preferably via an external supply of heat. In FIG. 5b, the expansion element 43 is activated, that is to say expanded, with respect to FIG. 5a. A comparatively small adjustment travel of the rod 45 is obtained, which is sufficient to lift the valve disc 46 out of its position of rest and release a flow gap into the short-circuit discharge line 9. The following coolant causes an expansion of the third expansion element 47, so that a further enlargement of the throughflow cross section of the valve disc 46 is obtained, as in FIG. 5c.

FIG. 5a shows the first working position with a shut-off short-circuit discharge line 9 and a shut-off radiator-side discharge line 8, so that the coolant is completely stationary in the cooling circuit. As in FIG. 5b, a second working position is obtained, in which the expansion element 43 is activated and the third valve disc 46 is opened by the amount of a gap counter to the force of the spring F2. Coolant circulates in the engine short-circuit and supplies heat to the expansion element 47 and to the expansion element 41. Thus, as in FIG. 5c, the short-circuit discharge line 9 can be opened further as a result of an expansion of the expansion element 47. The expansion element 41 subsequently opens the radiator-side discharge line 8. The expansion element is supplied with further heat by the coolant then flowing both through the short-circuit discharge line 9 and through the radiator-side discharge line 8, so that the expansion element shuts off the short-circuit discharge line 9 and completely opens the radiator-side discharge line 8 continuously according to the regulating-temperature range provided.

Figure 6:
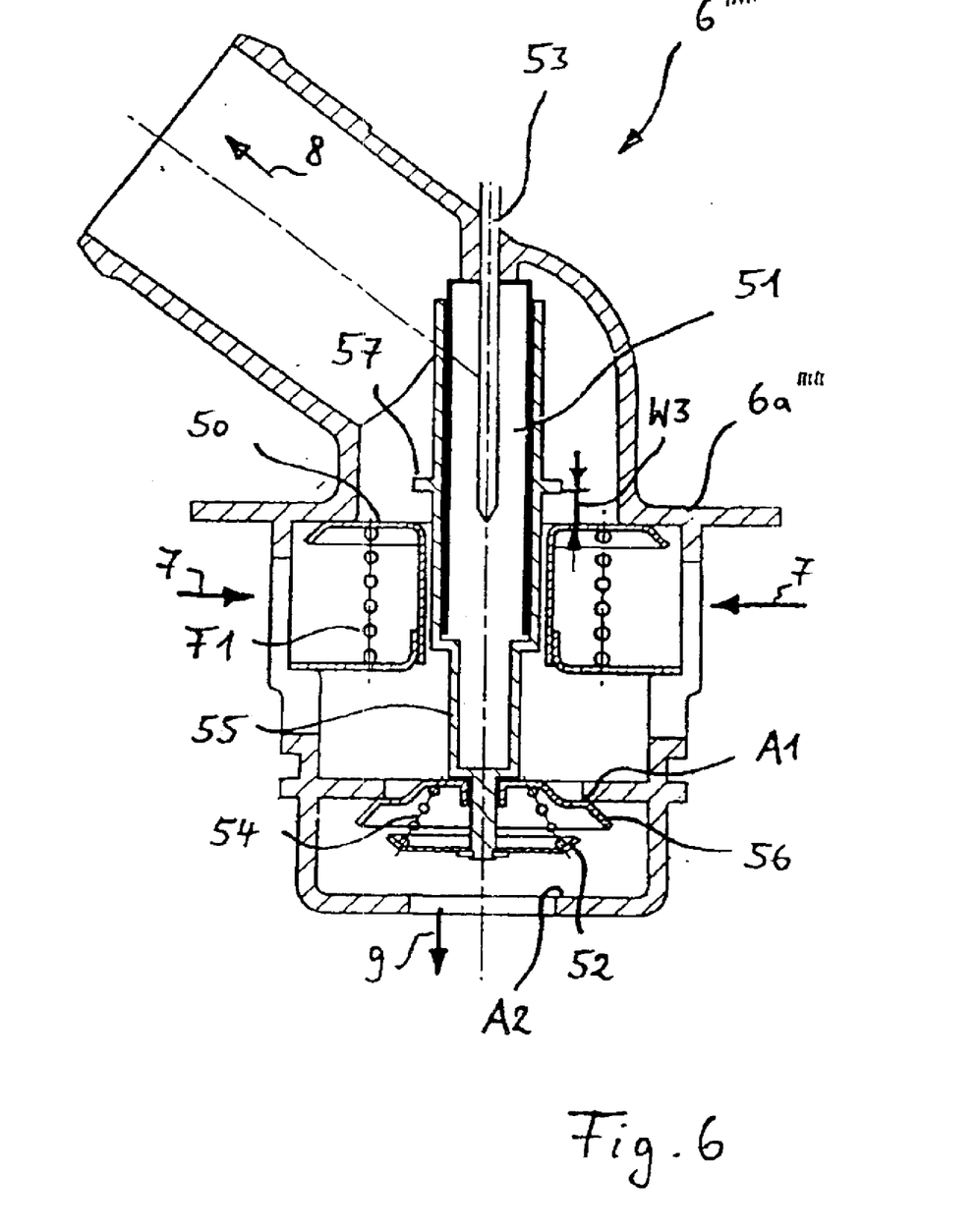
FIG. 6 shows a diagrammatic illustration of a fifth thermostatic valve in a first working position.

FIG. 6 illustrates a three-disc thermostatic valve 6"" in a first working position. The valve 6"" is assigned an engine-side supply line 7, a radiator-side discharge line 8 and a short-circuit discharge line 9.

To control the coolant volume stream through the valve 6"", three valve discs 50, 52, 56 movable particularly in translational motion are arranged within the valve housing 6a"". The first valve disc 50 is provided for shutting off the radiator-side discharge line 8 and is displaceable via an adjusting element in the form of an expansion element 51, whilst the second valve disc 52 and the third valve disc 56 are provided for shutting off the short-circuit discharge line 9. In this case, the second valve disc 52 is suspended on the third valve disc 56 via a spring 54. The first valve disc 50 is pressed, by a spring F1 supported against the housing 6a"", into its position of rest, in which the radiator-side discharge line 8 is shut off.

In a lower portion of the valve housing 6a"", the second and the third valve disc are assigned in each case a stop A1 and A2. In this case, the short-circuit discharge line 9 is shut off, on the one hand, when the second valve disc presses against the stop A2 and, on the other hand, when the third valve disc 56 presses against the stop A1. Both valve discs 52, 56 can be activated by way of the expansion element 51 via a rod 55 which pierces the valve disc 50. Starting from the first working position, as in FIG. 6, the activation of the valve discs 52, 56 first takes place independently, that is to say, uncoupled from the first valve disc 50. This is due to the fact that the first valve disc can be moved by the rod 55 via a flange-shaped driver 57, although, in the first working position, this driver 57 is initially arranged with a clearance W3 relative to the first valve disc 50, so that, in the event of a displacement of the rod 55, an initial idling travel of the driver 57 occurs. This idling travel W3 corresponds to the positioning of the valve discs 52 and 56 and to the associated stops A1 and A2 in such a way that, initially, the third valve disc 56 bears on the stop A1 and, after a displacement of the rod 55 by the amount of the idling travel W3, the second valve disc 52 does not yet bear on the stop A2. Only when the rod 55 has taken up the first valve disc 50 and thus opened the radiator-side discharge line 8 is the short-circuit discharge line 9 to be capable of being shut off via a further displacement of the rod 55.

Correspondingly to the other exemplary embodiments, the expansion element 51 is assigned an energy supply device 53 which allows external heating. Preferably, the expansion element 51 contains, in two separate chambers, wax fillings with different fusion or transformation or other expansion properties, so that part of the expansion element has an overriding response behavior.

The temperature regulation of the three-disc thermostatic valve 6"" takes place via the expansion element 51, whereby, on the one hand, the temperature-regulating range of the valve can be modified via the external supply of energy and, on the other hand, a throughflow of the valve 6"" can be initiated by way of the short-circuit discharge line 9 via an opening of the third valve disc 56.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Thermostatic valve for a coolant circuit of an internal combustion engine, comprising:
   a housing through which a flow is capable of passing and which has a first throughflow orifice for connection to a first coolant line, a second throughflow orifice for connection to a second coolant line, and a third throughflow orifice for connection to a third coolant line, and
   a closure member which is mounted in the housing and which can be adjusted by an actuating unit, the closure member having a first shut-off element for shutting off the first throughflow orifice and a second shut-off element, coupled to the first shut-off element, for shutting off the second throughflow orifice, wherein the second shut-off element is assigned an adjusting device, via which the second shut-off element can be adjusted relative to the first shut-off element in such a way that the closure member can be brought, on one hand, into a passage position in which the closure member can close exactly one of the throughflow orifices, and, on the other hand, into a shut-off position, in which the closure member can close two of the throughflow orifices.

2. Thermostatic valve according to claim 1, wherein the adjusting device is designed as a second independent actuating unit, mounted on a housing side, for the second shut-off element.

3. Thermostatic valve according to claim 1, wherein the adjusting device is designed as a second independent actuating unit, mounted on a closure-member side, for the second shut-off element.

4. Thermostatic valve according to claim 1, wherein the second actuating unit is designed as an electrically heatable expansion element or an expansion element capable of being thermally controlled via coolant in use.

5. Thermostatic valve according to claim 2, wherein the second actuating unit is designed as an electrically heatable expansion element or an expansion element capable of being thermally controlled via coolant in use.

6. Thermostatic valve for a coolant circuit of an internal combustion engine, comprising:
   a housing through which a flow is capable of passing and which has a first throughflow orifice for connection to a first coolant line, a second throughflow orifice for connection to a second coolant line, and a third throughflow orifice for connection to a third coolant line, and
   a closure member which is mounted in or on the housing and which can be adjusted by an actuating unit, the closure member having a first shut-off element for shutting off the first throughflow orifice and a second shut-off element, coupled to the first shut-off element, for shutting off the second throughflow orifice,
   wherein the closure member is assigned a third shut-off element which can be adjusted relative to the first and the second shut-off element in such a way that the closure member can be brought, on one hand, into a passage position in which the closure member can close exactly one of the throughflow orifices and, on the other hand, into a shut-off position, in which the closure member can close two of the throughflow orifices.

7. Thermostatic valve according to claim 1, wherein a tap orifice, via which coolant can be supplied or discharged, is provided on the housing.

8. Thermostatic valve according to claim 2, wherein a tap orifice, via which coolant can be supplied or discharged, is provided on the housing.

9. Thermostatic valve according to claim 3, wherein a tap orifice, via which coolant can be supplied or discharged, is provided on the housing.

10. Thermostatic valve according to claim 4, wherein a tap orifice, via which coolant can be supplied or discharged, is provided on the housing.

11. Thermostatic valve according to claim 6, wherein a tap orifice, via which coolant can be supplied or discharged, is provided on the housing.

12. Coolant circuit of an internal combustion engine, comprising:
   a coolant/air heat exchanger which is assigned a bypass line, and
   coolant branching between a heat exchanger line and the bypass line being controllable as a function of temperature via a thermostatic valve which has a first connection to the heat exchanger line, a second connection to the bypass line, and a third connection to a supply or discharge line located on an internal combustion engine side, and which comprises a closure member which can be adjusted by way of an actuating unit and which is assigned a first shut-off element for shutting off the heat exchanger line and a second shut-off element, coupled to the first shut-off element, for shutting off the bypass line,
   wherein the second shut-off element is assigned an adjusting device, via which the second shut-off element can be adjusted relative to the first shut-off element in such a way that the closure member can be brought, on one hand, into a passage position, in which the closure member can close either the bypass line or the heat exchanger line, and, on the other hand, into a shut-off position, in which the closure member can close both the bypass line and the heat exchanger line.

13. Coolant circuit of an internal combustion engine, comprising:
   a coolant/air heat exchanger which is assigned a bypass line, and
   coolant branching between a heat exchanger line and the bypass line being controllable as a function of temperature via a thermostatic valve which has a first connection to the heat exchanger line, a second connection to the bypass line, and a third connection to a supply or discharge line located on an internal combustion engine side, and which comprises a closure member which can be adjusted by ways of an actuating unit and which is assigned a first shut-off element for shutting off the heat exchanger line and a second shut-off element, coupled to the first shut-off element, for shutting off the bypass line,
   wherein the closure member is assigned a third shut-off element which can be adjusted relative to the first and the second shut-off element in such a way that the closure member can be brought, on one hand, into a passage position, in which the closure member can close either the bypass line or the heat exchanger line, and, on the other hand, into a shut-off position, in which the closure member can close both the bypass line and the heat exchanger line.

14. Coolant circuit according to claim 12, wherein the thermostatic valve has a tap line, via which coolant can be transferred from the thermostatic valve to a second heat exchanger of the internal combustion engine.

15. Coolant circuit according to claim 13, wherein the thermostatic valve has a tap line, via which coolant can be transferred from the thermostatic valve to a second heat exchanger of the internal combustion engine.

16. Method for operating an internal combustion engine of a motor vehicle having a coolant circuit, comprising:
   after a cold start of the internal combustion engine initially interrupting the coolant circuit by a thermostatic valve, and
   subsequently, opening the coolant circuit between the internal combustion engine and a bypass line by an adjustment of a closure member of the thermostatic valve.

17. Method according to claim 16, wherein the adjustment of the closure member is carried out via an expansion element arranged within the coolant circuit.

18. Method according to claim 16, wherein, with the coolant circuit interrupted, coolant is discharged from the thermostatic valve via a tap line.

19. Method according to claim 17, wherein, with the coolant circuit interrupted, coolant is discharged from the thermostatic valve via a tap line.

20. A method of making a thermostatic valve comprising making the thermostatic valve of claim 1.

21. A method of using a thermostatic valve for a coolant circuit comprising utilizing the thermostatic valve of claim 1.

22. A method of making a thermostatic valve comprising making the thermostatic valve of claim 6.

23. A method of using a thermostatic valve for a coolant circuit comprising utilizing the thermostatic valve of claim 6.

24. The method of claim 16, wherein the thermostatic valve comprises:

a housing through which a flow is capable of passing and which has a first throughflow orifice for connection to a first coolant line, a second throughflow orifice for connection to a second coolant line, and a third throughflow orifice for connection to a third coolant line, and a closure member which is mounted in the housing and which can be adjusted by an actuating unit, the closure member having a first shut-off element for shutting off the first throughflow orifice and a second shut-off element, coupled to the first shut-off element, for shutting off the second throughflow orifice, wherein the second shut-off element is assigned an adjusting device, via which the second shut-off element can be adjusted relative to the first shut-off element in such a way that the closure member can be brought, on one hand, into a passage position in which the closure member can close exactly one of the throughflow orifices, and, on the other hand, into a shut-off position, in which the closure member can close two of the throughflow orifices.

25. The method of claim 16, wherein the thermostatic valve comprises:

a housing through which a flow is capable of passing and which has a first throughflow orifice for connection to a first coolant line, a second throughflow orifice for connection to a second coolant line, and a third throughflow orifice for connection to a third coolant line, and a closure member which is mounted in or on the housing and which can be adjusted by an actuating unit, the closure member having a first shut-off element for shutting off the first throughflow orifice and a second shut-off element, coupled to the first shut-off element, for shutting off the second throughflow orifice, wherein the closure member is assigned a third shut-off element which can be adjusted relative to the first and the second shut-off element in such a way that the closure member can be brought, on one hand, into a passage position in which the closure member can close exactly one of the throughflow orifices and, on the other hand, into a shut-off position, in which the closure member can close two of the throughflow orifices.

26. A thermostatic valve for a coolant circuit, comprising:

a housing having a first orifice connectable to a discharge line, a second orifice connectable to a discharge line, and a third orifice connectable to a supply line, a closing member mounted in the housing and adjustable by an activating unit, the closing member having a first element for closing the first orifice and a second element for closing the second orifice, the elements being coupled together, and an adjuster assigned to the second element to operatively adjust the second element in relation to the first element, wherein the adjuster operatively provides that the closing member has at least a first position which closes only one of the orifices and a second position which closes two of the orifices.

* * * * *